United States Patent [19]
Murayama et al.

[11] Patent Number: 4,555,738
[45] Date of Patent: Nov. 26, 1985

[54] HEAD ADJUSTING DISK

[75] Inventors: Noriaki Murayama; Kiyoto Abe, both of Furukawa, Japan

[73] Assignee: Alps Electric Co., Ltd., Japan

[21] Appl. No.: 570,302

[22] Filed: Jan. 13, 1984

[30] Foreign Application Priority Data

Jan. 13, 1983 [JP] Japan ................................ 58-2168[U]

[51] Int. Cl.[4] ............................................ G11B 21/00
[52] U.S. Cl. .................................................... 360/75
[58] Field of Search ..................... 360/75, 77, 78, 135

[56] References Cited

PUBLICATIONS

IBM Technical Disclosure Bulletin, vol. 17, No. 11, Apr. 1975, pp. 3415–3416, Eccentricity Tolerant Head Alignment Check, D. E. Sibbers.

*Primary Examiner*—George G. Stellar
*Attorney, Agent, or Firm*—Guy W. Shoup

[57] ABSTRACT

An improved head adjusting disk is disclosed which is adapted to be used for adjustment of the position of a head in a mechanism such as a floppy disk drive mechanism. On the improved head adjusting disk, two head position adjusting record tracks for adjustment of the position of a head are formed such that an outer circumferential edge of one of the record tracks and an inner circumferential edge of the other record track extend along a same circumference and that one of the two record tracks is formed to extend along a portion of one n'th (where n > 1 and n = 2) of the circumference while the other record track is formed to extend along the remaining (1 − 1/n) portion of the circumference, whereby individual signals reproduced from the two head position adjusting record tracks can be distinguished from each other by difference in duration thereof.

4 Claims, 8 Drawing Figures

HEAD ADJUSTING DISK

BACKGROUND OF THE INVENTION

This invention relates to a head adjusting disk adapted to adjust the position of a head in a floppy disk drive mechanism or the like.

In apparatus in which a floppy disk is used, such as, for example, word processors which exhibited wide spread in recent years, a floppy disk on which data are written must be able to be used on a same data recording device at least of the same type. To this end, at least mounting conditions of a head on a floppy disk drive mechanism must be the same for apparatus in which the same type of floppy disks is used.

Conventionally, adjustment of mounting conditions of a head is conducted in a quality controlling step in a production line. Thus, fine adjustment of a head which has been adjusted temporarily in prior is effected using a head adjusting disk on which a reference record track is formed.

Adjustment of the position of a head is especially important among adjustments of mounting conditions of such a head. This is an adjustment in which an error of the position of a head mounted in a radially inward or outward direction from a designated position is adjusted. As a method of such adjustment, it is known to use an eccentric annular track.

FIG. 1 is an illustrative view showing an example of a head adjustment disk used for such a head position adjusting method. Referring to this figure, reference character 1 designates a head adjusting disk, 2 an index hole, 3 and 4 designate each a head position adjusting record track, 5 designates a locus of a head to be adjusted, O the center of rotation, and A an eccentric center.

Referring further to FIG. 1, the index hole 2 in the form of a perforation is formed in the head adjusting disk 1 at a position spaced a predetermined distance from the center of rotation O of the disk 1. The head position adjusting record tracks 3, 4 (hereinafter referred to simply as record tracks) are formed in concentrical annular configurations having their centers at the eccentric center A on a straight line X—X' which interconnects the center of rotation O and the index hole 2.

Locations of the record tracks 3, 4 are designed in the following way. If the head adjusting disk 1 is mounted on a turn table (not shown) and is rotated in a direction of an arrow mark B around the center of rotation O, then the record tracks 3, 4 will naturally be in eccentric positions.

Meanwhile, adjustment of the position of a head is commonly effected so as to bring a head (not shown) into precise coincident with a record track which is located at the center of a recording area of a floppy disk (this record track will be hereinafter referred to as a central record track). Locations of the record tracks 3, 4 are determined such that, if a locus of the head where the head is precisely coincident with the central record track is indicated as the locus 5, the locus 5 coincides with the record track 4 at a point P on the line X—X' on the same side as the eccentric center A relative to the center of rotation O while it coincides with the record track 3 at a point Q on the line X—X' on the opposite side to the eccentric center A relative to the center of rotation O.

Then, if the adjusting disk 1 is rotated to effect scanning for reproduction with a head the position of which has been temporarily or roughly adjusted, then signals recorded on the record track 3 and signals recorded on the other record track 4 will be reproduced with a time lag during rotation.

FIGS. 2A and 2B are diagrams showing waveforms of reproduction signals obtained from the record tracks 3, 4 of FIG. 1. If it is assumed that signals in a period of time T1 are reproduction signals from the record track 4 while signals in a period of time T2 are reproduction signals from the record track 3, then FIG. 2A shows reproduction signals when a head to be adjusted is properly adjusted in position while FIG. 2B shows reproduction signals when a head to be adjusted is displaced radially inwardly of the head adjusting disk 1 from a proper position to which the head is to be positioned.

In particular, if a head to be adjusted is at a proper position, a scanning locus thereof corresponds to the locus 5 as shown in FIG. 1 and thus coincides with the record track 3 at the point Q while it coincides with the record track 4 at the point P. The record tracks 3, 4 have signals of a same fixed frequency recorded with the same intensity thereon, and hence envelopes of signals in a period T2 in which reproduction is effected from the record track 3 will be the same as envelopes of signals in a period T1 in which reproduction is effected from the track 4.

On the other hand, if the head to be adjusted is displaced radially inwardly of the head adjusting disk 1, the head to be adjusted is displaced from the record track 3 so that peaks of envelopes of signals in a period T2 in which reproduction is effected from the record track 3 will be reduced, as seen from FIG. 2B. Further, the head to be adjusted crosses the record track 4 twice, and peaks of the reproduction signals hold their maximum within this portion of a period T1. On the contrary, if the head to be adjusted is displaced radially outwardly of the head adjusting disk 1, peaks of the reproduction signals will hold their maximum in a period T2 during reproduction from the record track 3 while peaks of signals will be held low in a period T1 during reproduction from the record track 4, on the contrary to FIG. 2B. Accordingly, the extent and direction of displacement of a head can be detected with high accuracy from a ratio of peaks (lobe ratio) of signals in periods T1 and T2, and precise adjustment of the position of a head can be attained, accordingly.

By the way, in a method of adjusting the position of a head using such a conventional head adjusting disk, signals reproduced from record tracks 3, 4 must be distinguished from each other, or else, the direction of displacement of the head to be adjusted cannot be discriminated.

Therefore, it has been common to produce signals presenting the reference of time in synchronism with scanning for reproduction of record tracks 3, 4 in order to discriminate individual reproduction signals from relationships of time of the signals relative to the reference time signals. In order to produce such reference time signals, a method is conventionally employed to detect the index hole 2 of FIG. 2.

In particular, a disk drive mechanism is provided with an optical means including a light emitting diode and a phototransistor for detecting an index hole 2. Now, if it is assumed that the index hole 2 is detected to provide a corresponding pulse signal (hereinafter referred to as a hole signal) when a head to be adjusted is positioned at a point R on a line Y—Y' which is perpendicular to the line X—X' relative to the head adjusting disk 1, then from the reference of time presented by the hole signal, signals are first reproduced from the record track 4 and then signals are reproduced from the record track 3. Accordingly, order of reproduction signals from the record tracks 3, 4 is determined relative to the hole signal, and thus discrimination of both signals can be enabled thereby.

In this way, adjustment of the position of a head to be adjusted is enabled with high accuracy. However, in a conventional head adjusting disk, a record track which is located in eccentric relationship relative to the center of rotation must be formed with high accuracy. Thus, in order to form such a record track on a head adjusting disk, a special disk eccentric drive mechanism is necessary. Besides, such a record track must be formed with high accuracy such that, when a head to be adjusted is placed in a proper position, the locus 5 of the head to be adjusted must be completely coincided with the eccentric tracks each at just one point (points P and Q). But, it is very difficult to form such eccentric tracks with high accuracy on the head adjusting disk. Accordingly, the conventional method has a defect that a large error inevitably appears to such eccentric record tracks, which will deteriorate accuracy of adjustment of the position of a head. Although it is possible, when the position of a head is to be adjusted, to eliminate influence of such an error, time and labor therefor cannot be avoided to become extremely great.

Also, in adjustment of the position of a head using a conventional head adjusting disk as described above, it is common to compare peaks of waveforms of reproduction signals from the recording head 3, 4 (FIG. 1) with eyesight. As a result, adjustment of the head position may be accompanied by exhaustion, and besides accuracy must be questioned.

Further, it is necessary for a disk drive mechanism to be provided with means for detecting an index hole. Thus, a disk drive mechanism must include means which has no direct connection with data writing and reading operations to and from a floppy disk. Moreover, it is disadvantageous in that, in a disk drive mechanism which has no such index hole detecting means, reproduction signals from record tracks 3, 4 cannot be distinguished from each other, and as a result, the position of a head cannot be adjusted.

SUMMARY OF THE INVENTION

Accordingly, it is an object of the present invention to provide a head adjusting disk which eliminates such defects of conventional head adjusting disks as described above and in which two head position adjusting record tracks which are used to detect displacement of the position of a head can be formed in concentric relationship around the center of rotation of the disk, enabling definite distinction of reproduction signals from the individual record tracks without necessity of any additional auxiliary means while displacement of the position of the head can be detected quite easily with eyesight.

In order to attain this object, the present invention provides a head adjusting disk characterized in that two head position adjusting record tracks for adjustment of the position of a head are formed such that an outer circumferential edge of one of the two head position adjusting record tracks and an inner circumferential edge of the other of the two head position adjusting record tracks extend along a same circumference and that one of the two head position adjusting record tracks is formed to extend along a portion of one n'th (where n>1 and n=2) of the circumference while the other of the two head position adjusting record tracks is formed to extend along the remaining (1−1/n) portion of the circumference, whereby individual signals reproduced from the two head position adjusting record tracks have differentiated durations corresponding respectively to period of time of scanning for reproduction of the individual record tracks so that from which record tracks individual reproduction signals are obtained can be discriminated by comparison of such durations.

The foregoing and other objects and advantages of the present invention will be made apparent from a subsequent description of a preferred embodiment of the invention made with the reference to the accompanying drawings.

DETAILED DESCRIPTION OF THE PREFERRED EMBODIMENT

Figure 3:
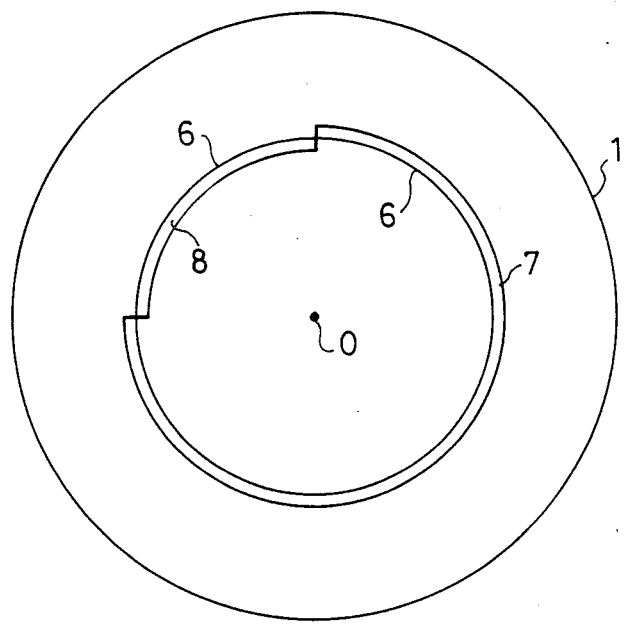
FIG. 3 is an illustrative view showing an embodiment of a head adjusting disk according to the present invention.

Referring to an illustrative view of FIG. 3 which shows an embodiment of a head adjusting disk according to the present invention, like or equivalent parts are designated by like reference numerals or symbols. In this figure, reference numeral 6 designates a head positioning center line, and reference numerals 7 and 8 designate each a head position adjusting record track.

In FIG. 3, the head positioning center line 6 is a line which coincides with the center line of a scanning locus of a head to be adjusted (not shown) when the head is in a proper position to be adjusted. Accordingly, the position of the head is to be adjusted so as to produce a scanning locus which has the center line that coincides with the head positioning center line 6.

Figure 1:
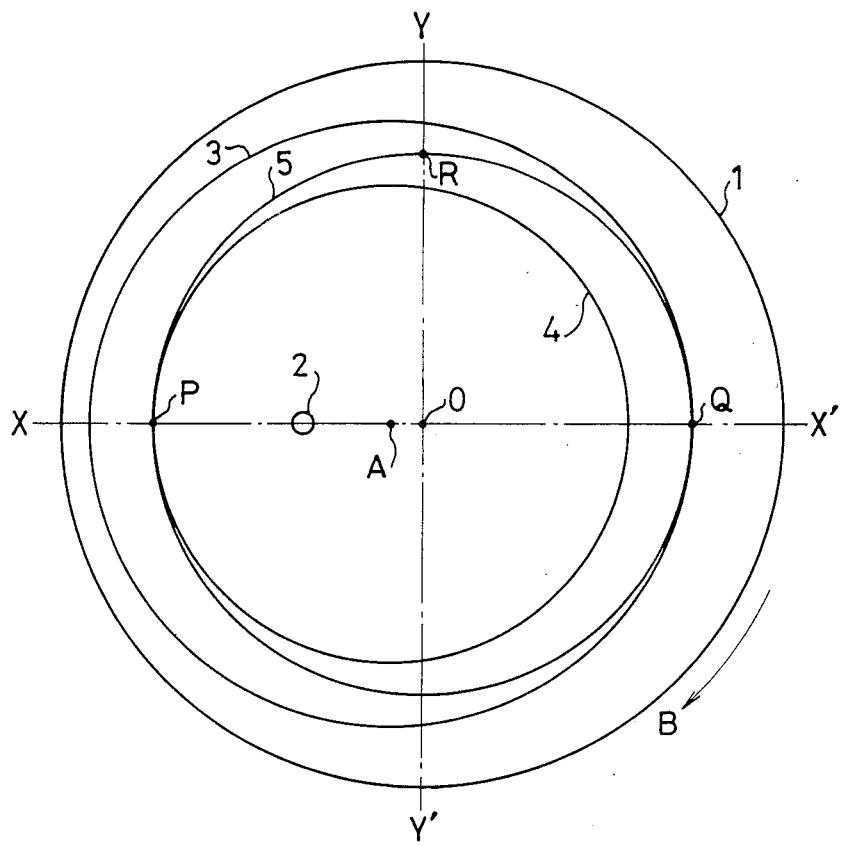
FIG. 1 is an illustrative view showing an example of a conventional head adjusting disk.
Figure 2A:
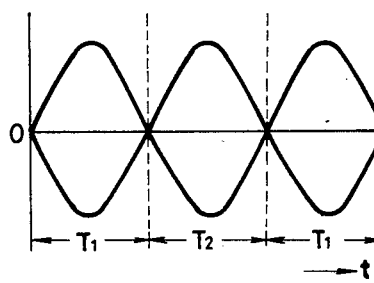
FIGS. 2A and 2B are diagrams showing waveforms of reproduction signals obtained by scanning for reproduction of the head adjusting disk of FIG. 1.
Figure 2B:
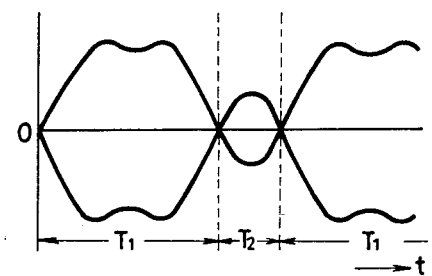

The head position adjusting record track (hereinafter referred to simply as a record track) 7 has one of circumferential edges thereof which is radially inwardly relative to the other, that is, an inner circumferential edge thereof in FIG. 3, coincided with the head positioning center line 6 and extends along three fourths of the entire circumference of the head positioning center line 6 while the record track 8 has an outer circumferential edge thereof coincided with the head positioning center line 6 and extends along the remaining one fourth of the entire circumference of the head positioning center line 6. It is to be noted that signals of a same fixed frequency are recorded with a same intensity on the record tracks 7, 8 in the same manner as in the conventional head adjusting disk of FIG. 1.

Now, if the head adjusting disk 1 is mounted and rotated on a head drive mechanism to effect scanning for reproduction of the record tracks 7, 8 with a head the position of which is adjusted roughly, then reproduction signals can be obtained alternately from the record tracks 7 and 8. The reproduction signals from the record tracks 7, 8 are signals having durations corresponding to periods of time of scanning for reproduction of the record tracks 7, 8, and if there is some displacement of the position of the head to be adjusted, there will appear a difference in level between reproduction signals from the record tracks 7 and 8. Accordingly, if such reproduction signals are coupled to a measuring instrument such as an oscilloscope, two levels having different durations will be indicated on the instrument, enabling an operator to discriminate with eyesight the direction and extent of displacement of the position of the head to be adjusted.

Figure 4A:
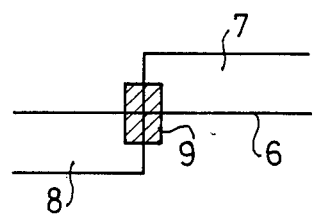
FIGS. 4A and 4B are diagrammatic representations showing positional relationships of a head to be adjusted relative to position adjusting record tracks of the head adjusting disk of FIG. 3.
Figure 4B:
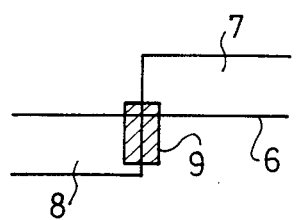

FIGS. 4A and 4B are diagrammatic representations which show different examples of positions of the head to be adjusted relative to the record tracks 7, 8 of FIG. 3. In FIGS. 4A and 4B, reference numeral 9 designates a head to be adjusted.

Figure 5A:
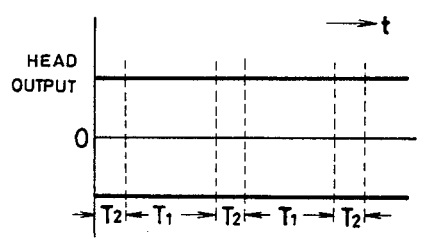
FIGS. 5A and 5B are diagrams showing waveforms of reproduction signals of the head to be adjusted which is at a position as shown in FIGS. 4A and 4B, respectively.
Figure 5B:
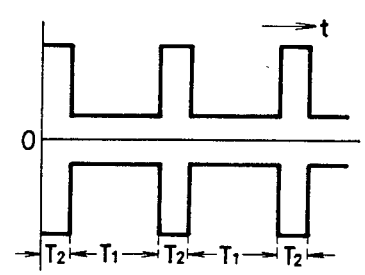

FIGS. 5A and 5B are diagrams showing waveforms of reproduction signals obtained from the head to be adjusted which is in the positions as shown in FIGS. 4A and 4B, respectively. In FIGS. 5A and 5B, reference symbol T1 designates a period of time in which the record track 7 of FIG. 3 is scanned for reproduction thereof, and reference symbol T2 designates a period of time in which the record track 8 is scanned for reproduction thereof.

FIG. 4A shows a condition in which the position of the head 9 is adjusted to its proper position. In this position, the center line of the head 9 to be adjusted coincides with the head positioning center line 6 and hence the record tracks 7 and 8 are scanned in the same width by the head 9 to be adjusted. Accordingly, the reproduction signals from record tracks 7, 8 by the head 9 to be adjusted have a same level as seen in FIG. 5A, and on a measuring instrument such as an oscilloscope, the reproduction signals from the head 9 to be adjusted will be indicated as a signal which has a fixed level.

On the other hand, FIG. 4B shows a condition in which the head 9 to be adjusted is displaced radially inwardly of the head adjusting disk 1 (FIG. 3), and in this position, the head 9 to be adjusted will scan the record track 8 in greater width than the record track 7. Accordingly, the level of reproduction signals obtained from the record track 7 by the head 9 to be adjusted is relatively low while the level of reproduction signals obtained from the record track 8 is relatively high. As a consequence, on a measuring instrument such as an oscilloscope, reproduction signals from the head 9 to be adjusted will be indicated as a signal presenting a waveform of pulses in which portions of a high level have a relatively short duration.

On the contrary, where the head 9 to be adjusted is displaced radially outwardly of the head adjusting disk 1, reproduction signals obtained from the head 9 to be adjusted have a high level when the record track 7 is scanned while it has a low level when the record track 8 is scanned. Thus, on a measuring instrument such as an oscilloscope, the reproduction signals will be indicated as a signal presenting a waveform of pulses in which portions of a high level have a relatively long duration.

In this way, in detecting displacement of the position of the head to be adjusted using the head adjusting disk of the present embodiment, portions of a waveform having different levels are indicated in different durations on a measuring instrument such as an oscilloscope, thereby enabling an operator to clearly recognize the extent and direction of displacement of the position of the head to be adjusted. Also, when the head to be adjusted is located in its proper position, reproduction signals therefrom are indicated as a signal which has a fixed level. This means that detection of displacement of the position of the head is effected by recognition of a waveform indicated on a measuring instrument, resulting in facilitation of detection of such displacement and also in reduction of the time and labor required for detection of such displacement of the position thereby to reduce fatigue of the operator. Especially, even if an oscilloscope gets out of synchronism and indicates a waveform incorrectly or a flow of waveform, it is of no trouble for recognition of indication of the waveform. Rather, it can be detected definitely that a head to be adjusted is located in its proper position since such indication of a waveform can be regarded as to present a waveform in a stabilized condition which has no flow of waveform indication.

It is to be noted that, while description has been given only of the head adjusting disk of the embodiment on which the record track 7 is formed along three fourths of an entire circumference and the record track 8 is formed along one fourth of the entire circumference, the present invention is not limited to this embodiment, and equivalent effects can be attained by a head adjusting disk on which record tracks 7, 8 are formed in different extents so as to differentiate the time required for scanning for reproduction of the individual record tracks 7, 8.

As apparent from the foregoing description, according to the present invention, two position adjusting record tracks are formed in concentrical relationship around the center of rotation of a head adjusting disk, and hence such record tracks can be formed easily with high accuracy. Also, reproduction signals obtained from such two position adjusting record tracks can be distinguished definitely without necessity of a specific additional means to facilitate accurate detection of an extent of displacement of the position of a head to be adjusted, resulting in significant improvement in accuracy of adjustment of the position of the head to be adjusted. Thus, it is clearly understood that the present invention provides a head adjusting disk which eliminates such defects of conventional head adjusting disks as described hereinabove and attains excellent functions which have not yet been attained by conventional head adjusting disks.

What is claimed is:

1. In a head adjusting disk which has first and second head position adjusting record tracks formed thereon in concentrical relationship around the center of rotation thereof in order to enable adjustment of the position of a head to be adjusted by comparing amplitude of reproduction signals obtained by scanning for reproduction of said first and second head position adjusting record tracks with the head to be adjusted, the improvement wherein said first and second head position adjusting record tracks are formed such that an outer circumferential edge of one of said first and second head position adjusting record tracks and an inner circumferential edge of the other of said first and second head position adjusting record tracks extend along a same circumference and that one of said first and second head position adjusting record tracks is formed to extend along a portion of one n'th (where n>1 and n≠2) of the circumference while the other of said first and second head position adjusting record tracks is formed to extend along the remaining (1−1/n) portion of the circumference, whereby individual signals reproduced from said first and second head position adjusting record tracks can be distinguished from each other by difference in duration thereof.

2. A head adjusting disk according to claim 1, wherein it is used with a floppy disk drive mechanism.

3. A head adjusting disk according to claim 1, wherein that portion of an inner circumferential edge of said first head position adjusting record track which extends along the same circumference with an outer circumferential edge of said second head position adjusting record track has an extent greater than one half of the circumference.

4. A head adjusting disk according to claim 1, wherein that portion of an outer circumferential edge of said first head position adjusting record track which extends along the same circumference with an inner circumferential edge of said second head position adjusting record track has an extent greater than one half of the circumference.

* * * * *